(12) United States Patent
Bukkems et al.

(10) Patent No.: US 12,105,319 B2
(45) Date of Patent: Oct. 1, 2024

(54) LIGHTING ARRANGEMENT WITH LIGHT GUIDE ELEMENT

(71) Applicant: SIGNIFY HOLDING B.V., Eindhoven (NL)

(72) Inventors: Peter Johannes Martinus Bukkems, Bocholt (BE); Ludovicus Johannes Lambertus Haenen, Sint Oedenrode (NL); Barry Mos, Bocholt (BE)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/564,383

(22) PCT Filed: May 17, 2022

(86) PCT No.: PCT/EP2022/063265
§ 371 (c)(1),
(2) Date: Nov. 27, 2023

(87) PCT Pub. No.: WO2022/248284
PCT Pub. Date: Dec. 1, 2022

(65) Prior Publication Data
US 2024/0210613 A1    Jun. 27, 2024

(30) Foreign Application Priority Data
May 27, 2021  (EP) ..................................... 21176341

(51) Int. Cl.
F21V 8/00    (2006.01)

(52) U.S. Cl.
CPC ......... *G02B 6/0091* (2013.01); *G02B 6/0088* (2013.01)

(58) Field of Classification Search
CPC ............................. G02B 6/0091; G02B 6/0088
See application file for complete search history.

(56) References Cited

U.S. PATENT DOCUMENTS

| 6,697,130 B2* | 2/2004 | Weindorf ............... H05B 45/18 |
| | | 349/150 |
| 9,377,573 B2* | 6/2016 | Na .......................... G02B 6/009 |
| 9,897,750 B2* | 2/2018 | Feuerle ................. G02B 6/0073 |

(Continued)

FOREIGN PATENT DOCUMENTS

| CN | 106382520 A | 2/2017 |
| CN | 206669360 U | 11/2017 |

(Continued)

*Primary Examiner* — Arman B Fallahkhair

(57) ABSTRACT

A lighting arrangement (100), comprising: LEDs (110), a PCB (120) arranged to support the LEDs, a light guide element (130) configured to guide light emitted from the LEDs, wherein the light guide element is plate-shaped and arranged in a plane, P, and wherein the LEDs are arranged at an edge (140) of the light guide element, a support structure (150) fastened to the PCB and arranged at at least a first edge portion (155) of the light guide element, wherein the support structure comprises a groove (190), wherein the lighting arrangement further comprises a cover plate (200) comprising flanges (210) matingly and biasedly arranged in the groove, whereby the support structure, via first (160) and second portions (170) thereof, clamp the at least a first edge portion of the light guide element for positioning of the LEDs at the edge of the light guide element.

15 Claims, 7 Drawing Sheets

(56) References Cited

U.S. PATENT DOCUMENTS

| | | | |
|---|---|---|---|
| 10,571,616 B2* | 2/2020 | Schenkl | G02B 6/0021 |
| 11,708,970 B2* | 7/2023 | Ma | F21V 17/06 |
| | | | 362/92 |
| 2011/0069510 A1* | 3/2011 | Yamashita | G02B 6/0085 |
| | | | 362/611 |
| 2013/0336008 A1* | 12/2013 | Kim | F21V 19/003 |
| | | | 362/382 |
| 2014/0126243 A1 | 5/2014 | Blessitt et al. | |
| 2016/0299287 A1* | 10/2016 | Li | G02B 6/005 |
| 2020/0257039 A1* | 8/2020 | Du | G02B 6/0091 |

FOREIGN PATENT DOCUMENTS

| | | |
|---|---|---|
| CN | 207394543 U | 5/2018 |
| EP | 3771859 A1 | 2/2021 |
| KR | 100996403 B1 | 11/2010 |
| KR | 101185523 B1 | 9/2012 |
| KR | 101221196 B1 | 1/2013 |
| KR | 20180137373 A | 12/2018 |

\* cited by examiner

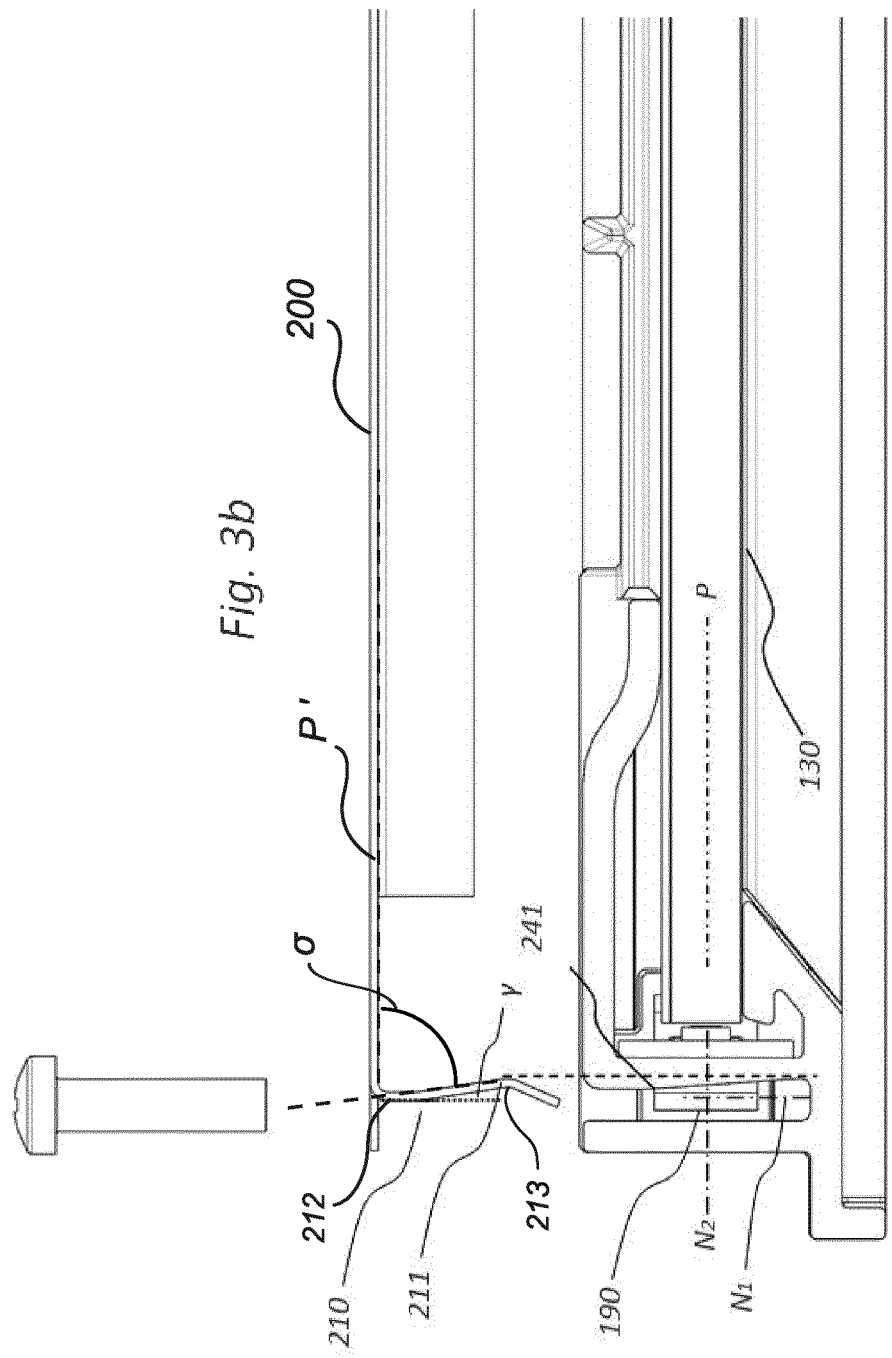

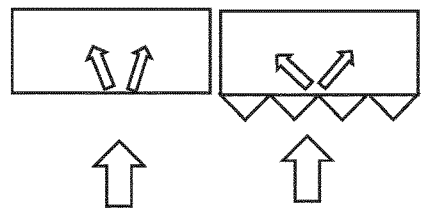
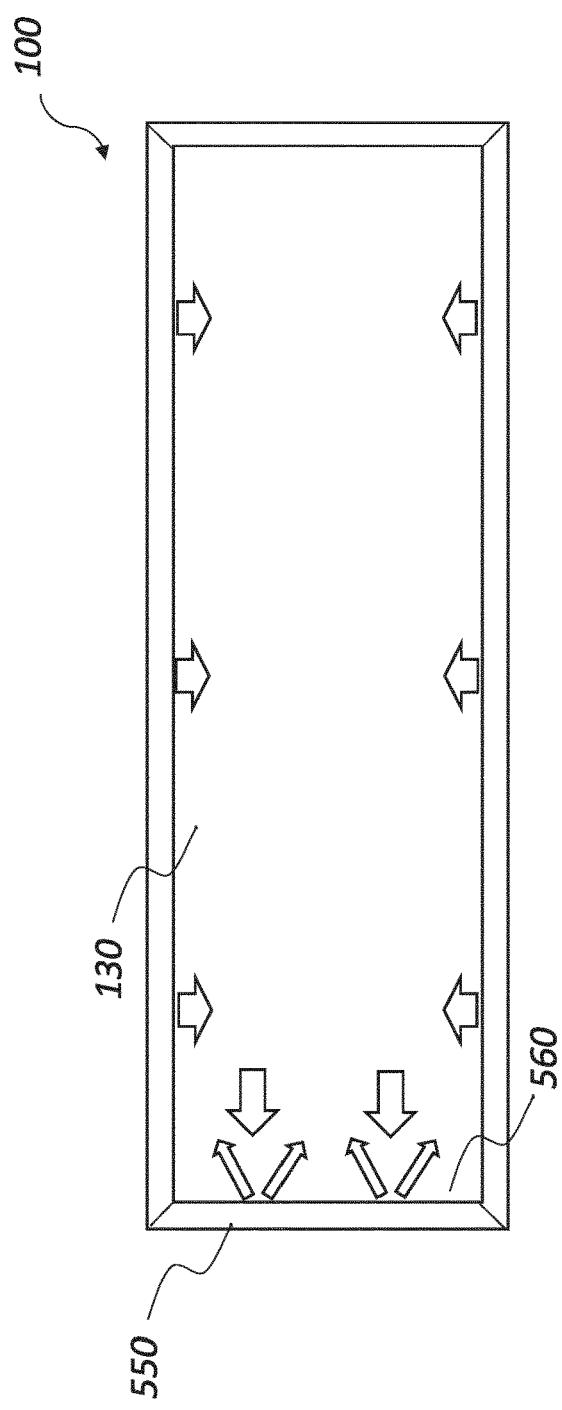
Fig. 4a
Fig. 4b

LIGHTING ARRANGEMENT WITH LIGHT GUIDE ELEMENT

CROSS-REFERENCE TO PRIOR APPLICATIONS

This application is the U.S. National Phase application under 35 U.S.C. § 371 of International Application No. PCT/EP2022/063265, filed on May 17, 2022, which claims the benefit of European Patent Application No. 21176341.2, filed on May 27, 2021. These applications are hereby incorporated by reference herein.

FIELD OF THE INVENTION

The present invention generally relates to lighting arrangements. In particular, the lighting arrangements comprise light guide elements for guiding light.

BACKGROUND OF THE INVENTION

The area of illumination has seen a rapid development with the introduction of new technologies, such as light emitting diodes, LEDs. The area is under continuous transformation and continues to attract attention. Compared to traditional light sources such as incandescent lamps, fluorescent lamps, neon tube lamps, etc., arrangements or devices comprising LEDs provide numerous advantages such as an increased flexibility and control, a more compact design, and/or a reduced power consumption. In particular, traditional light sources are rapidly being replaced by LED-based lighting solutions.

In particular, the costs related to LEDs have been reduced dramatically in the past. Now, the dominant part of the cost may be associated with other components and/or elements in a lighting arrangement apart from the LEDs, such as the LED housing, the printed circuit board (PCB), etc. Hence, there is a wish to even further decrease the LED lighting arrangement costs. Furthermore, it is preferred that the LED lighting arrangements are aesthetically attractive and provide light which has desirable properties such as e.g. low glare, high comfort for observers, etc.

Light guide system and/or arrangements in the prior art usually have limited tolerance capabilities for the alignment of the LEDs. Consequently, due to the influence(s) of e.g. thermal expansion, mechanical flexing, etc., the light output from the light guide system and/or arrangements may vary. In turn, this may deteriorate the properties of the emitted light, such as e.g. higher glare, decreased comfort for observers, etc. Furthermore, the attractiveness and/or service life of the light guide system and/or arrangement may be deteriorated as a consequence.

Hence, it is an object of the present invention to provide improved lighting arrangements in order to mitigate these shortcomings. In particular, there is a wish to provide a cost-efficient lighting arrangement which may provide tolerance to influence(s) of the lighting arrangement such as e.g. thermal expansion, mechanical flexing, etc., such that the lighting arrangement may provide a desired light emission.

SUMMARY OF THE INVENTION

In the light of the above, it is of interest to provide alternative lighting arrangements in order to improve their usability, in particular by facilitating any maintenance and/or repair of the lighting arrangements. These and other objects are achieved by providing a lighting arrangement having the features in the independent claims. Preferred embodiments are defined in the dependent claims.

Hence, according to the present invention, there is provided a lighting arrangement. The lighting arrangement comprises at least one light emitting diode, LED, arranged to emit light and a printed circuit board, PCB, arranged to support the at least one LED. The lighting arrangement further comprises a light guide element configured to guide light emitted from the at least one LED, wherein the light guide element is plate-shaped and arranged in a plane, P, and wherein the at least one LED is arranged at an edge of the light guide element. The lighting arrangement further comprises a support structure fastened to the PCB and arranged at at least a first edge portion of the light guide element. The support structure comprises a first portion and a second portion arranged to extend along a first side and a second side of the light guide element, respectively, and along a portion of the light guide element in the plane, P, wherein the first portion and the second portion abut the first side and the second side of the light guide element, respectively. The support structure further comprises a groove. The groove has a groove inner wall extending between an opening and a bottom of the groove. The lighting arrangement further comprises a cover plate arranged in parallel to the plane, P, and arranged to cover the first side of the light guide element. The cover plate comprises at least one flange. The flange has a first end by which it is connected to the cover plate, and a second free end. The free end of the at least one flange is inserted in the groove of the support structure through the opening of the groove. The flange contacts the inner wall of the groove at a contact location C. The inner wall of the groove extends at a (n average) groove angle π from the opening to the contact location C, and the flange extends at a (n average) flange angle σ from its first end to the contact location C. The indicated angles relate to a corner enclosing the light guide plate. Because said groove angle π is somewhat larger, for example 1.5°, 3° or 5° or 10° or even 20°, than the flange angle σ, the flange is matingly and biasedly arranged in the groove of the support structure for biasing the first portion of the support structure towards the light guide element, whereby the first portion and the second portion clamp the at least a first edge portion of the light guide element for positioning of the at least one LED at the edge of the light guide element. When the groove angle π and/or the flange angle σ are smaller by at least 3° than 90°, the cover plate clamps itself onto the support structure, and extra fastening elements can be omitted. Typically the groove angle π and flange angle σ are in the range of 70° to 110°, preferably in the range of 80° to 100°, wherein the groove angle π is larger than the flange angle σ, for example by 1.5°, 3° or 5° or 10° or even 20°. When the groove angle is less than 1.5° larger than the flange angle, the biasing is insufficient for its purpose. When the groove angle is more than 20° larger than the flange angle, insertion of the flange in the groove is relatively difficult and there is a significant risk of undesired plastic deformation of the flange and/or cover plate. Preferably, the contact location C is at a side of the inner wall of the groove closest to the light guide plate.

Thus, the present invention is based on the idea of providing a lighting arrangement in which the LEDs are positioned at the edge of the light guide element of the lighting arrangement even if subjected to thermal and/or mechanical influence. In other words, due to the features of the lighting arrangement, in particular the connection between the support structure, the light guide element and the cover plate, the lighting arrangement is able to maintain a desired position of the LEDs at the edge of the light guide element even in case the lighting arrangement is subjected to influence(s) and/or condition(s) such as e.g. thermal expansion or contraction and/or mechanical impact(s). Due to this zero-tolerance and spring-loaded concept achieved by the lighting arrangement, the lighting arrangement is able to provide a stable light output and a high (light) coupling efficiency.

As the LEDs of the lighting arrangement may be kept at a desired position with respect to the edge of the light guide element, the present invention is advantageous in that the lighting arrangement may provide a reliable and/or stable output of the light from the lighting arrangement. Consequently, a more appealing light output for an observer is generated from the lighting arrangement during operation.

The present invention is further advantageous in that the lighting arrangement increases the service life thereof and/or decreases the need for maintenance due its tolerance for thermal and/or mechanical influence.

The present invention is further advantageous in that the lighting arrangement is conveniently and easily assembled. More specifically, the cover plate and the support structure may be conveniently attached by the mating engagement of the flange(s) of the cover plate and the groove of the support structure.

It will be appreciated that the lighting arrangement of the present invention further comprises relatively few components. The relatively low number of components is advantageous in that the lighting arrangement is relatively inexpensive to fabricate. The relative simplicity of the configuration of the lighting arrangement renders a (cost) efficient production of the lighting arrangement.

It will be appreciated that the lighting arrangement of the present invention may be suitable for use in a number of lighting devices, luminaires, or the like. Thus, the lighting arrangement may be beneficial in substantially any area for illumination purposes. The lighting arrangement of the present invention is further advantageous in that it comprises one or more LEDs as its light source. It will be appreciated that the LED lighting arrangement further enhances the sustainability, compactness and suitability for different areas of use. This may further prove beneficial as the LED lighting arrangement may provide a longer operational life, a reduced power consumption, and an increased efficiency related to the ratio between light energy and heat energy.

The lighting arrangement comprises at least one LED arranged to emit light and a PCB arranged to support the at least one LED. Hence, the PCB is configured to provide electric and mechanic support for the LEDs. The lighting arrangement further comprises a light guide element configured to guide light emitted from the LEDs. By the term "light guide element", it is here meant substantially any element, material, structure, or the like, which is arranged or configured to guide and/or reflect the light emitted from the LEDs during operation. For example, the light guide element may comprise a light guide and a reflector. The light guide element is plate-shaped and arranged in a plane, P, and wherein the at least one LED is arranged at an edge of the light guide element.

The lighting arrangement further comprises a support structure fastened to the PCB and arranged at at least a first edge portion of the light guide element. Hence, the support structure is arranged at the (peripheral) first edge portion(s) of the plate-shaped light guide element. The support structure comprises a first portion and a second portion arranged to extend along a first side and a second side of the light guide element, respectively. Hence, the first and seconds portions of the support structure respectively extend along the oppositely arranged first and second sides of the plate-shaped light guide element. The first and second portions of the support structure further extend along a portion of the light guide element in the plane, P, wherein the first portion and the second portion abut the first side and the second side of the light guide element, respectively. Hence, the first and second portions of the support structure constitute a jaw of the support structure which is arranged to receive the first edge portion of the light guide element.

The support structure further comprises a groove. At least a part of the groove (slit) may extend substantially perpendicular to the plane, P, in which the light guide element extends.

The lighting arrangement further comprises a cover plate arranged in parallel to the plane, P, wherein the cover plate is arranged to cover the first side of the light guide element. By "cover plate", it is here meant a plate, sheet, or the like, which is arranged parallel to the first side of the light guide element. The cover plate comprises at least one flange. By the term "flange", it is here meant a tab, a portion of the cover plate. Hence, the flange(s) extend(s) or project(s) from the cover plate. The at least one flange is matingly and biasedly arranged in the groove of the support structure for biasing the first portion of the support structure towards the light guide element. By the term "biasedly arranged", it is here meant that the flange(s) and the groove impart a force which biases (pushes) the first portion of the support structure towards the light guide element. As a consequence of this biased arrangement of the flange(s) in the groove, the first portion and the second portion of the support structure clamp the first edge portion of the light guide element for positioning of the at least one LED at the edge of the light guide element. In other words, the support structure is configured to clamp, secure or fixate the first edge portion of the light guide element via its first and second portions in order to provide a positioning of the LED(s) at the edge of the light guide element.

According to an embodiment of the present invention, the lighting arrangement may further comprise at least one spacer element arranged between the PCB and the light guide element for defining a minimum distance therebetween. Hence, the spacer element(s) is (are) arranged between the PCB and the light guide element in order to ensure a minimum distance between the PCB and the light guide element. It will be appreciated that the spacer element(s) hereby are configured to guide the forces introduced by the flange(s) through the light guide element. Furthermore, the arrangement of the spacer element(s) avoids that the forces introduced by the flange(s) of the cover plate are guided through the LED(s), as this could limit the life time of the lighting arrangement. Hence, the present embodiment is advantageous in that the life time and/or service life of the lighting arrangement may be extended.

According to an embodiment of the present invention, the light guide element may comprise a light guide and a reflector, wherein the light guide and the reflector are superimposed. Hence, the light guide element may comprise a light guide arranged to guide light propagating therein and a reflector arranged to reflect light incident thereon, wherein the light guide and the reflector are arranged on top of each other. The present embodiment is advantageous in that the support structure ensures that the reflector is biased or pushed towards the (back side of the) light guide.

According to an embodiment of the present invention, at least a portion of the groove may be inclined with respect to a normal, $N_1$, to the plane, P, and inclined in an opposite direction of a normal, $N_2$, to the edge of the light guide element, whereby the at least a portion of the groove forms a V-shaped profile. Hence, the portion(s) of the groove and the flange(s) of the cover plate biasedly interact, whereby the flange(s), which are biased by the groove portion(s), impart(s) a force which biases (pushes) the first portion of the support structure towards the light guide element. The present embodiment is advantageous in that the V-shaped profile of the groove improves the biasing of the LEDs at the edge of the light guide element and compensates for influence(s) and/or condition(s) such as e.g. thermal expansion or contraction and/or mechanical impact(s). Consequently, the lighting arrangement is able to provide a stable light output and a high (light) coupling efficiency.

According to an embodiment of the present invention, the at least a portion the groove may be inclined with respect to the normal, $N_1$, to the plane, P, and inclined in an opposite direction of the normal, $N_2$, to the edge of the light guide element, by a first angle, $\alpha$, wherein the first angle, $\alpha$, is in the range $1.5°\leq\alpha\geq 200$. Preferably, the first angle, $\alpha$, may be in the range $10°\leq\alpha\leq 15°$. According to an example, the first angle, $\alpha$, may be determined as a function of at least one property of at least one of the PCB, the light guide element, and the cover plate. Hence, the portion of the groove forming a V-shaped profile is inclined by a first angle, $\alpha$, with respect to the normal, $N_1$, to the plane, P, and inclined in an opposite direction of the normal, $N_2$, to the edge of the light guide element, wherein the first angle, $\alpha$, furthermore may be determined as a function of one or more properties of the PCB, the light guide element, and/or the cover plate. The present embodiment is advantageous in that the design or shape of the portion(s) of the groove, as determined by the first angle, $\alpha$, even further improves the zero-tolerance and spring-loaded concept of the lighting arrangement.

According to an embodiment of the present invention, the groove may be inclined with respect to a normal, $N_1$, to the plane, P, and inclined in a direction of a normal, $N_2$, to the edge of the light guide element, by a second angle, $\beta$, wherein the second angle, $\beta$, is in the range $1.5°\leq|\beta|\leq 20°$. Preferably, the second angle, $\beta$, may be in the range $10°\leq|\beta|\leq 15°$. Hence, the groove may be inclined, or tilted, with respect to the normal, $N_1$, to the plane, P, and in a direction of the normal, $N_2$, to the edge of the light guide element. The present embodiment is advantageous in that the inclined or tilted groove, as determined by the second angle, $\beta$, may even further improve the zero-tolerance and spring-loaded concept of the lighting arrangement. According to an embodiment of the present invention, at least a portion of the at least one flange may be inclined with respect to a normal, $N_1$, to the plane, P, and inclined in an opposite direction of a normal, $N_2$, to the edge of the light guide element by a third angle, $\gamma$, wherein the third angle, $\gamma$, is in the range $1.5°\leq|\gamma|\leq 20°$. Hence, at least a portion of the flange(s) of the cover plate may be mutually inclined such that the groove and the flange(s) biasedly interact. For example, a portion of the flange may comprise a ridge extending in the opposite direction of the normal, $N_2$, whereby the flange imparts a force which biases (pushes) the first portion of the support structure towards the light guide element. The present embodiment is advantageous in that the flange(s) of the cover plate may be conveniently attached into the groove(s) of the support structure, e.g. via a snap function. Furthermore, by the present embodiment, the fastening elements may be dispensed with in some cases if desired. The embodiment is further advantageous in that the improved fastening between the cover plate and the support structure via the flange(s) and groove(s) may consequently lead to an even more stable light output and higher (light) coupling efficiency of the lighting arrangement. It is noted that both $\beta$ and $\gamma$ can be both positive or negative. Herein positive angle means an angle rendering the groove or flange to extend at a groove angle $\pi$ respectively a flange angle $\sigma$ of larger than 90° with plane P of a corner enclosing the light guide plate. Herein negative angle means an angle rendering the groove or flange to extend at a groove angle $\pi$ respectively a flange angle $\sigma$ of smaller than 90° with plane P of a corner enclosing the light guide plate.

According to an embodiment of the present invention, the lighting arrangement may further comprise a plurality of fastening elements arranged to fasten the cover plate to the support structure. By the term "fastening element", it is here meant substantially any fastening and/or attaching element such as rivet, screw, etc. The provision of fastening elements according to the present embodiment is advantageous in that the lighting arrangement is compressed, and is set in its zero-tolerance and spring loaded state.

According to an embodiment of the present invention, the at least one flange may be arranged at a peripheral portion of the cover plate.

According to an embodiment of the present invention, the lighting arrangement may comprise a plurality of flanges spaced apart by respective peripheral regions of the cover plate, wherein the plurality of fastening elements is arranged in the peripheral regions. In other words, the flanges may be provided at (regular) intervals at the peripheral portion of the cover plate, wherein the fastening elements are arranged in the peripheral regions between the peripheral portions. The present embodiment is advantageous in that it provides a symmetric biasing or spring-load of the lighting arrangement. The present embodiment is further advantageous in that it provides a convenient mounting of the lighting arrangement.

According to an example of the present invention, the light guide element and the cover plate may be rectangular, and the support structure may be arranged at all four edge portions of the light guide element. Hence, the support structure may be arranged at all four edge portions of the rectangular, plate-shaped light guide element.

According to an embodiment of the present invention, the lighting arrangement may further comprise a diffuser element arranged parallel to the light guide element and configured to diffuse light emitted from the at least one LED, wherein the support structure comprises a third portion arranged to hold the diffuser element. By the term "diffuser", it is here meant substantially any element, material, etc., which is arranged to diffuse the light incident thereon. For example, the diffuser element may be a microstructure plate. The lighting arrangement according to the present embodiment is advantageous in in that the support structure may, apart from the light guide element, conveniently also hold the diffuser element. Furthermore, the diffuser element is advantageous in that an even more desired distribution of the light exiting the lighting arrangement may be provided during operation.

According to an embodiment of the present invention, the edge of the light guide element may comprise a flat surface. Hence, the surface of the edge of the light guide element may be flat and/or smooth.

According to an embodiment of the present invention, the edge of the light guide element may comprise a profiled surface. By the term "profiled surface", it is here meant that the surface comprises a (non-flat) profile, structure, pattern, or the like.

According to an embodiment of the present invention, the lighting arrangement may further comprise an optical element arranged at at least a second edge portion of the light guide element. The optical element, which is arranged to reflect the light propagating in the light guide of the light guide element, is advantageous in that the resulting outcoupling of the light from the lighting arrangement is increased. More specifically, the light from the LEDs during operation of the lighting arrangement may exit the light guide element at the sides, in case the light is not retained in the light guide element due to total internal reflection, TIR. Hence, the light may therefore be "lost" at the sides, and not contribute to the resulting outcoupling of the light. Hence, by the optical element arranged at the second edge portion(s) of the light guide element, the light (or at least a major portion thereof) may be reflected by the optical element into the light guide, thereby increasing the light output efficiency of the lighting arrangement. Furthermore, the provision of the optical element according to the present embodiment is convenient in its arrangement. It should be noted that prior art systems may comprise a reflective foil which is glued on the sides of a light guide, which is inefficient with respect to time and/or cost (e.g. due to an additional process step), and which furthermore may lead to an inferior reflection capability. In contrast, the optical element(s) of the present embodiment provide(s) the advantages of a time and/or cost-efficient assembly, as well as an improved reflection by TIR. Moreover, by providing a profile on the side of the optical element facing the edge of the light guide, i.e. the incoupling side, wherein the profile comprises microstructures, bezels, or the like, the mixing of the light may be improved.

According to an embodiment of the present invention, there is provided a luminaire for arrangement in a ceiling. The luminaire comprises a lighting arrangement according to any one of the previously described embodiments, and an electrical connection connected to the at least one LED for a supply of power to the at least one LED. The present embodiment is advantageous in that the luminaire, comprising the lighting arrangement, may be conveniently arranged in a ceiling. Furthermore, due to the relatively low building height of the lighting arrangement, the luminaire comprising the lighting arrangement may be arranged as a suspended luminaire which provides a non-obstructive view for an observer. The present embodiment is further advantageous in that the luminaire is aesthetically attractive and provides light which has desirable properties such as e.g. low glare, high comfort for observers, etc.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
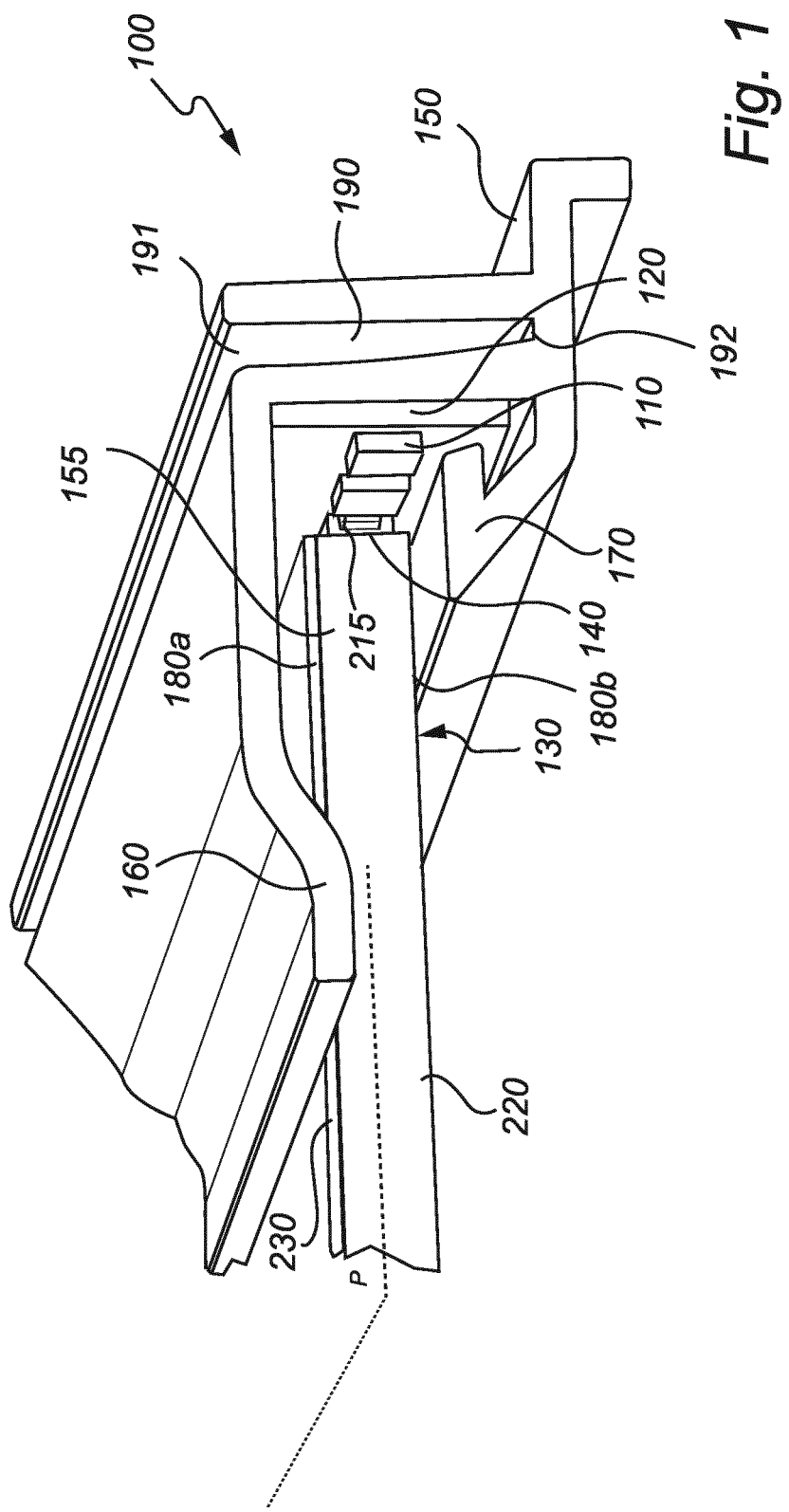
FIG. 1 schematically shows a view of a portion of a lighting arrangement according to an exemplifying embodiment of the present invention, FIG. 2 schematically shows an exploded view of a portion of a lighting arrangement according to an exemplifying embodiment of the present invention, FIGS. 3a and 3b schematically show exploded views of a portion of a lighting arrangement according to exemplifying embodiments of the present invention, FIG. 3c schematically shows a view of a portion of a lighting arrangement according to an exemplifying embodiment of the present invention, FIGS. 4a and 4b schematically show views of a portion of a lighting arrangement according to an exemplifying embodiment of the present invention, and FIG. 5 schematically shows a view of a luminaire comprising a lighting arrangement according to an exemplifying embodiment of the present invention.

FIG. 1 schematically shows a view of a portion of a lighting arrangement 100 according to an exemplifying embodiment of the present invention. The lighting arrangement 100 comprises at least one LED 110 arranged to emit light. It will be appreciated that the lighting arrangement 100 may comprise substantially any number of LEDs 110. In FIG. 1, the LEDs 110 are aligned in a (horizontal) array. The lighting arrangement 100 further comprises a PCB 120 arranged to support the LED(s) 110. According to an alternative example, the LEDs 110 may be provided as a LED strip comprising a flexible circuit board as carrier for the LEDs 110. The lighting arrangement 100 further comprises a light guide element 130 configured to guide light emitted from the LEDs 110. The light guide element 130 is plate-shaped and arranged in a plane, P. In this example, the light guide element 130 comprises a light guide 220 configured to guide light emitted from the LEDs 110, and a reflector 230 configured to reflect light emitted from the LEDs 110, wherein the light guide 220 and the reflector 230 are superimposed, i.e. arranged on top of each other. The LEDs 110 are arranged at an edge 140 of the light guide element 130. Hence, the LEDs 110 face the edge 140 of the light guide element 130 and are arranged in close vicinity of the edge 140.

The lighting arrangement 100 further comprises a support structure 150 which is fastened to the PCB 120. The support structure 150 may be a structure or profile which has been produced by extrusion. The support structure 150 is arranged at a first edge portion 155 of the light guide element 130, i.e. at a first edge portion 155 of the light guide element 130 in vicinity of the edge 140 of the light guide element 130. The support structure 150 comprises a first portion 160 and a second portion 170. Here, the first portion 160 is exemplified as a flange, which extends along the (upper) first side 180a of the light guide element 130 in the plane, P, thereof, and which, at least by a portion thereof, abuts this (upper) first side 180a of the light guide element 130. The second portion 160 is exemplified as a bezel or anvil, which extends along the (lower) second side 180b of the light guide element 130 in the plane, P, thereof, and which abuts this (lower) second side 180b of the light guide element 130.

The support structure 150 further comprises a groove 190. In FIG. 1, the groove 190 extends substantially in a vertical direction and opens upwards at an opening 191 and ends at a bottom 192.

In FIG. 1, the lighting arrangement 100 further comprises at least one spacer element 215 which is (are) arranged between the PCB 120 and the light guide element 130 for defining a minimum distance between the PCB 120 and the light guide element 130. The spacer element(s) 215 is (are) hereby configured to guide the forces through the light guide element 130.

Figure 2:
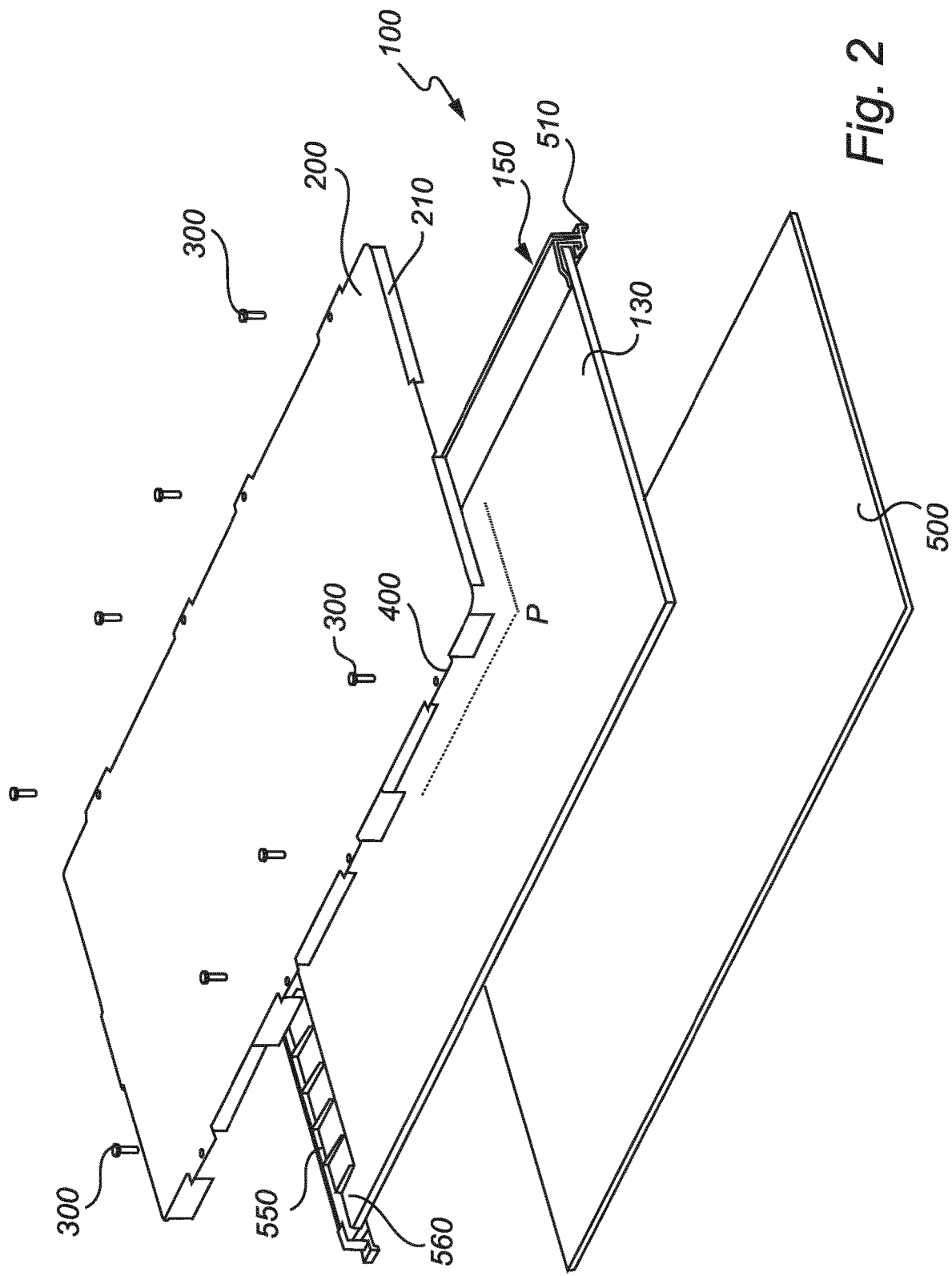

FIG. 2 schematically shows an exploded view of a lighting arrangement 100 according to an exemplifying embodiment of the present invention. The lighting arrangement 100 comprises a cover plate 200 which is arranged in parallel to the plane, P. The cover plate 200 is arranged to cover the (upper) first side of the light guide element 130. Here, it is exemplified that the light guide element 130 and the cover plate 200 are rectangular, but it should be noted that the light guide element 130 and the cover plate 200 may have substantially any form. The cover plate 200 comprises a least one flange 210. In this example, the at least one flange 210 extends perpendicular to the plane, P, but it should be noted that the flange(s) 210 may be inclined with respect to a normal from the plane, P. Here, the cover plate 200 is exemplified as comprising a plurality of flanges 210. The flanges 210 may have the form of rectangular-shaped tabs as exemplified in FIG. 2. The flanges 210 are arranged to be matingly and biasedly arranged in the groove of the support structure of the lighting arrangement 100, which is presented in more detail in FIGS. 3a and 3b.

The lighting arrangement 100 comprises a plurality of fastening elements 300 arranged to fasten the cover plate 200 to the support structure 150 of the lighting arrangement 100. In FIG. 2, the fastening elements 300 are exemplified as screws, rivets, or the like. The fastening elements 300 are arranged in peripheral regions 400 of the cover plate 200, wherein the peripheral regions 400 are provided between the flanges 210.

In FIG. 2, the lighting arrangement 100 further comprises a diffuser element 500 which is arranged parallel to the light guide element 130. The diffuser element 500 is configured to diffuse light emitted from the LEDs of the lighting arrangement 100 during operation. For example, the diffuser element 500 may constitute a microstructure plate. The support structure 150 comprises a third portion 510 arranged to hold the diffuser element 500.

According to the lighting arrangement 100 as exemplified in FIG. 2, the lighting arrangement 100 further comprises an optical element 550 arranged at a second edge portion 560 of the light guide element 130. It should be noted that the lighting arrangement 100 may comprise two oppositely arranged optical elements 550, but that FIG. 2 only shows a single optical element 550 for reasons of an improved overview of the lighting arrangement 100. The optical element(s) 550, e.g. in the form of end caps, reflective strips, bezels, or the like, is (are) arranged to reflect the light propagating in the light guide element 130. The optical element(s) 550 is (are) arranged in the lighting arrangement 100 such that the optical element(s) 550 is (are) in close vicinity of, and pushed/biased towards, the light guide element 130. There is no optical contact between the optical element(s) 550 and the light guide element 130. The principle of the optical element(s) 550 is further described in FIG. 4.

Figure 3A:
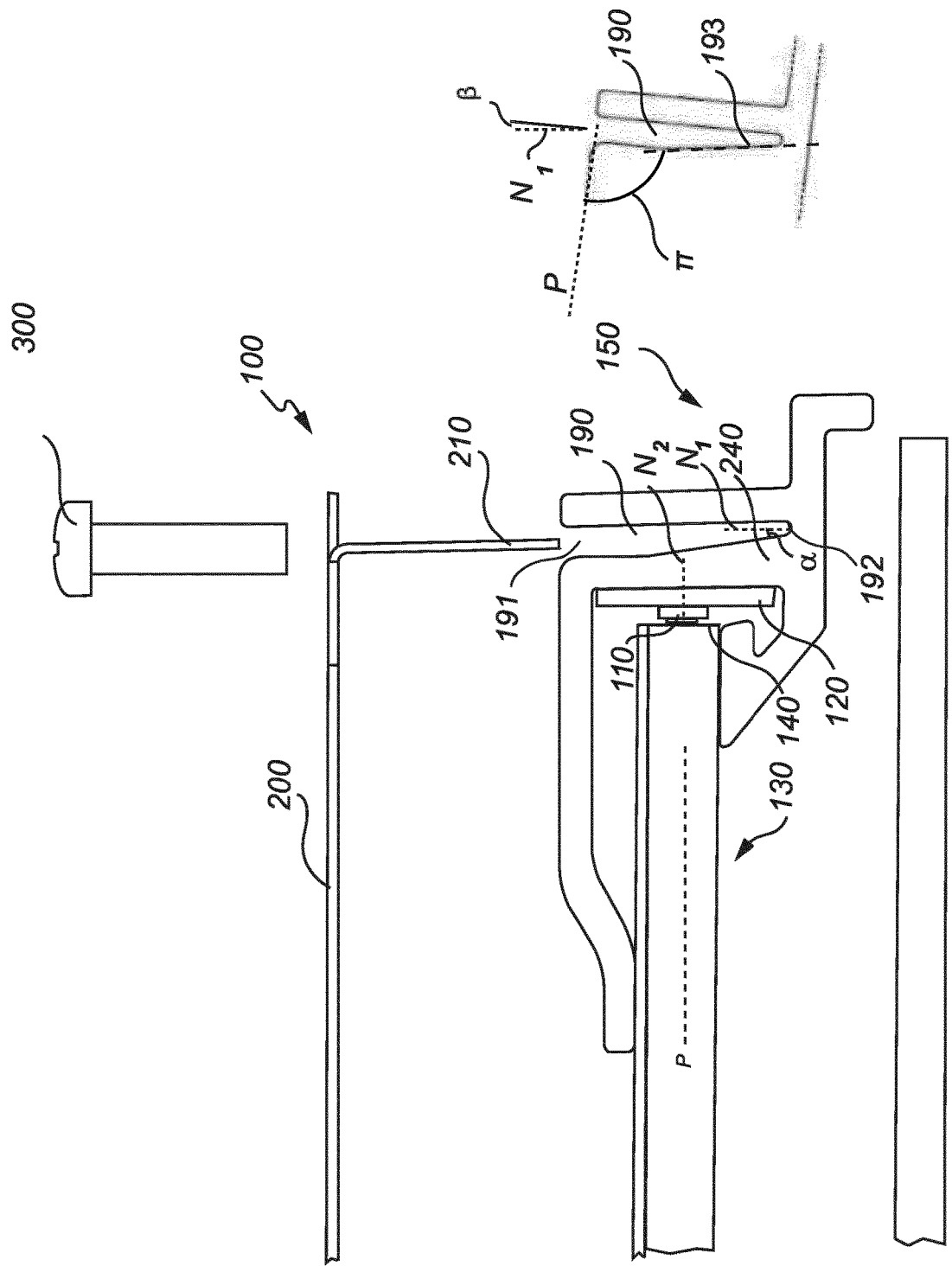
Figure 3C:
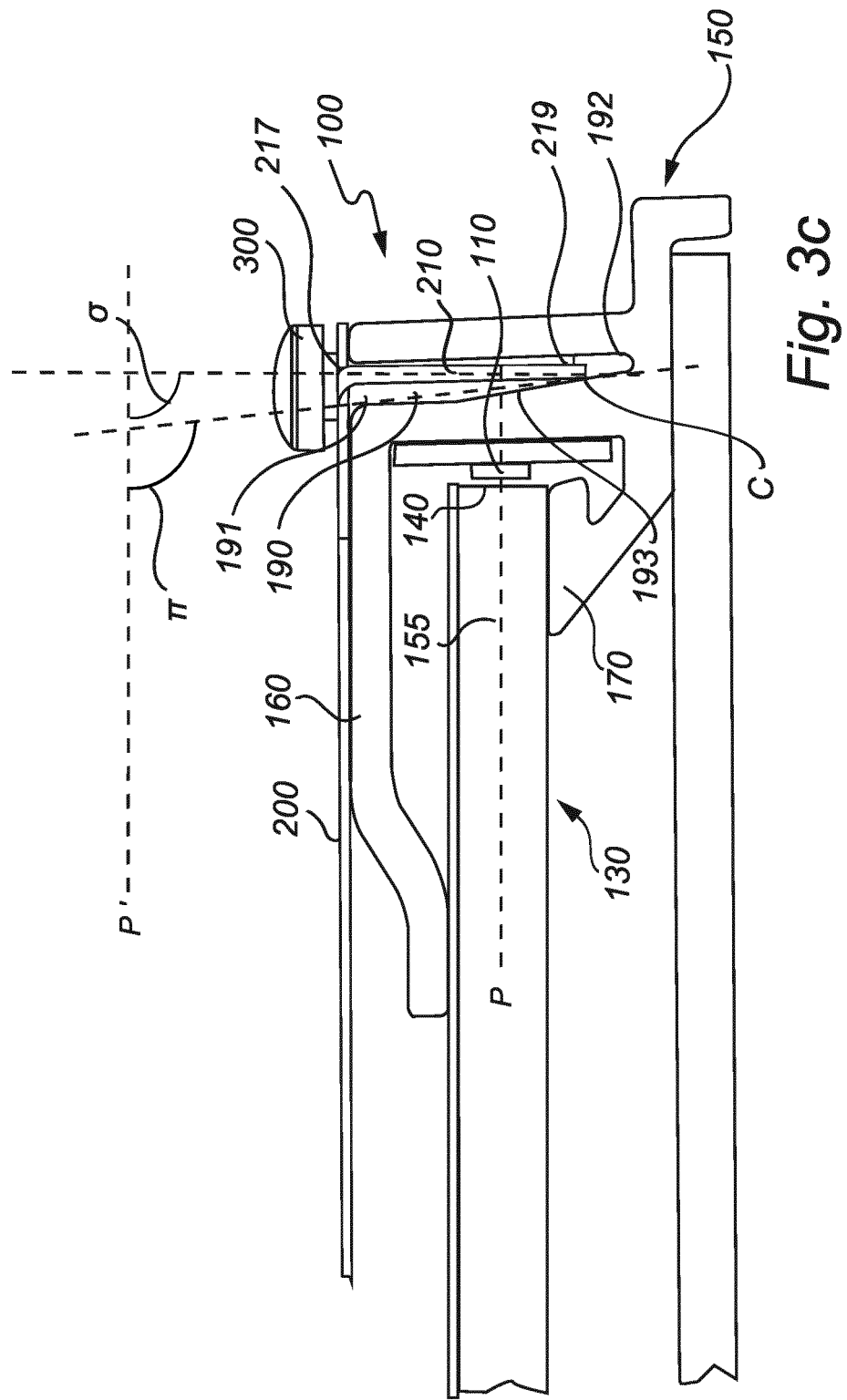

FIGS. 3a, 3b and 3c schematically show exploded views and a view in profile, respectively, of a portion of a lighting arrangement 100 according to an exemplifying embodiment of the present invention. For an increased understanding of the components and/or functioning of the lighting arrangement 100, it is referred to FIG. 1 and the associated text.

In FIG. 3a, the groove 190 of the support structure 150 comprises at least a portion 240 of the groove 190 which is inclined with respect to a normal, $N_1$, to the plane, P, and inclined in an opposite direction of a normal, $N_2$, to the edge 140 of the light guide element, i.e. the opening 191 of the groove 190 is closer in horizontal direction to the light guide plate than the bottom 192 of the groove 190. The portion(s) 240 of the groove 190 hereby form(s) a V-shaped profile. The portion 240 of the groove 190 is inclined by a first angle, α, which may be in the range of $1.5°≤α≤20°$, and preferably in the range of $10°≤α≤15°$. The first angle, α, may furthermore be determined as a function of one or more properties of one or more of the PCB 120, the light guide element 130, and the cover plate 200.

The flange(s) 210 of the cover plate 200, which in this specific example extend(s) perpendicular to the plane, P, are arranged to be matingly and biasedly arranged in the groove 190 of the support structure 150 of the lighting arrangement 100. By this zero-tolerance and spring-loaded concept of the lighting arrangement 100, the LEDs 110, supported by the PCB 120, are (become) arranged at the edge 140 of the light guide element 130. Hence, the LEDs 110 face the edge 140 of the light guide element 130 and are arranged in close vicinity of the edge 140.

The lighting arrangement 100 further comprises a plurality of fastening elements 300 (albeit only a single fastening element 300, exemplified as a screw, is shown in FIG. 3a) arranged to fasten the cover plate 200 to the support structure 150.

In the insert of the right-hand side of FIG. 3a, yet a further example of the lighting arrangement 100 is presented. It should be noted that the groove 190 of the lighting arrangement 100 is shown in isolation for reasons of simplicity of the example as described. Here, the groove 190 is inclined with respect to the normal, $N_1$, to the plane, P, and in a direction of the normal, $N_2$, to the edge of the light guide element, by a second angle, B. The second angle, β, may be in the range $1.5°≤|β|≤20°$, preferably $10°≤|β|≤15°$. A groove angle π between plane P and an inner wall 193 of the groove 190 is indicated and is equal to ß+90°. Here ß is about 10° and hence π is about 100°.

FIG. 3b schematically shows an exploded view in profile of the lighting of a portion of a lighting arrangement 100 according to an exemplifying embodiment of the present invention. The portion of the lighting arrangement 100 in FIG. 3b constitutes an alternative to the portion of the lighting arrangement 100 shown in FIG. 3a, and it is referred to FIG. 3a for an increased understanding of the components and/or functioning of the lighting arrangement 100.

In FIG. 3b, at least a portion 211 of the flange 210 of the cover plate 200 is inclined with respect to the normal, $N_1$, to the plane, P, and inclined in an opposite direction of a normal, $N_2$, to the edge of the light guide element 130 by a third angle, γ, wherein the third angle, γ, is in the range $1.5°≤|γ|≤20°$. According to the example as shown, the portion 211 of the flange 210 comprises a ridge which extends in the opposite direction of the normal, $N_2$ such that in horizontal direction a kink 213 of the portion 211 is closer to the light guide element 130 than a base portion 212 of the flange 210. Hence, the flange 210, which comprises the ridge, has a gull-wing shape. A flange angle σ between a portion of the flange and plane P', wherein P' extends parallel to plane P, is indicated and is equal to γ+90°, here γ is about −5°, and hence σ is about 85°.

In FIG. 3b, the groove 190 of the support structure comprises at least a portion 241 of the groove 190 which is inclined with respect to the normal, $N_1$, to the plane, P, and which is inclined in the direction of a normal, $N_2$, to the edge 140 of the light guide element. The portion(s) 241 of the groove 190 hereby form(s) profile shaped as an upside-down V.

FIG. 3c schematically shows a view in profile of the lighting arrangement shown in FIG. 3a in an exploded view, and it is referred to FIG. 3a for an increased understanding of the components and/or functioning of the lighting arrangement 100. As shown in the FIG. 3c, the groove has a groove inner wall 193 extending between the opening 191 and a bottom 192 of the groove 190. The lighting arrangement further comprises the cover plate 200 arranged in parallel to the plane P. The cover plate comprises at least one flange 210. The flange has a first end 217 at its base portion 212 by which it is connected to the cover plate, and a second free end 219. The free end 219 of the at least one flange 210 is inserted in the groove 190 of the support structure 150 through the opening 191 of the groove 190. The flange 210 contacts, in the FIG. 3c with its free end 219, the inner wall 193 of the groove 190 at a contact location C. The inner wall 193 of the groove 190 extends at a (n average) groove angle π from the opening 191 to the contact location C, rendering the opening 191 of the groove 190 of being closer in horizontal direction to the light guide plate than the bottom 192 of the groove 190. The flange 210 extends at a (n average) angle σ from its first end 217 to the contact location C. The indicated angles π and σ are of corners that enclose the light guide plate, and for the sake of clarity are indicated with respect to plane P' which extends parallel to plane P. Because said groove angle π is somewhat larger, for example 3° or 5° or 10°, than the flange angle σ, the flange(s) 210 of the cover plate 200 are matingly and biasedly arranged in the V-shaped groove 190 of the support structure 150 of the lighting arrangement 100. In the figure the groove angle π is 96°, while the flange angle σ is 90°, hence the groove angle π being 6° larger than the flange angle σ. When groove angle π and/or flange angle σ are smaller than 90°, the cover plate clamps itself onto the support structure, and extra bolts can be omitted. Consequently, the LEDs 110, which face the edge 140 of the light guide element 130, are arranged in close vicinity of the edge 140. In this position or arrangement of the lighting arrangement 100, the first portion 160 and the second portion 170 of the support structure 150 clamp the first edge portion 155 of the light guide element 130 for positioning of the LEDs 110 at the edge 140 of the light guide element 130. Furthermore, the plurality of fastening elements 300 fastens the cover plate 200 to the support structure 150 in order to provide the zero-tolerance and spring-loaded lighting arrangement 100.

FIG. 4a schematically shows a view of a portion of a lighting arrangement 100 according to an exemplifying embodiment of the present invention. The lighting arrangement 100 comprises an (schematically indicated) optical element 550 arranged at oppositely arranged second (short) edge portions 560 of the light guide element 130, whereby only a (single) optical element 550 at the short edge portion 560 is shown in FIG. 2 for reasons of simplicity. It is further referred to FIG. 2 and the associated text for an increased understanding of the features and/or functioning of the optical element 550. The optical element(s) 550, e.g. in the form of end caps, reflective strips, bezels, or the like, is (are) arranged to reflect the light propagating in the light guide element 130, indicated by arrows. It should be noted that a large part of the light is reflected by total internal refection (TIR), but relatively large angles of the light, as indicated in FIG. 4, is not reflected by TIR. By the arrangement of the optical element(s) 550 of the lighting arrangement 100, a major part of the light is recycled by the reflection provided by the optical element(s) 550.

The optical element(s) 550 of the lighting arrangement 100 may comprise a flat surface (i.e. non-profiled and/or comprising no texture) or a profiled surface (i.e. comprising a texture) facing the edge of the light guide element 130, as indicated in FIG. 4b in the upper and lower figures respectively. Experiments have shown that the profiled surface of the optical element(s) 550 as indicated in the lower figure in FIG. 4b, comprising a texture in the form of triangles creating an angle within 30-60°, such as e.g. 45°, with respect to the normal of the edge, decreases the light mixing length. Furthermore, the profiled surface/texture of the optical element(s) 550 may increase the light output ratio (LOR). Preferably, the textures of the optical element(s) 550 are relatively small in respect to the thickness of the light guide. Examples of the profiled structure may comprise relatively sharp pyramid-formed textures, sinus-shaped textures, etc., and profiles of this kind may be produced conveniently by a laser equipment. The profiled structure of the optical element(s) 550 may spread the light in one direction such that the light mixing length is decreased.

Figure 5:
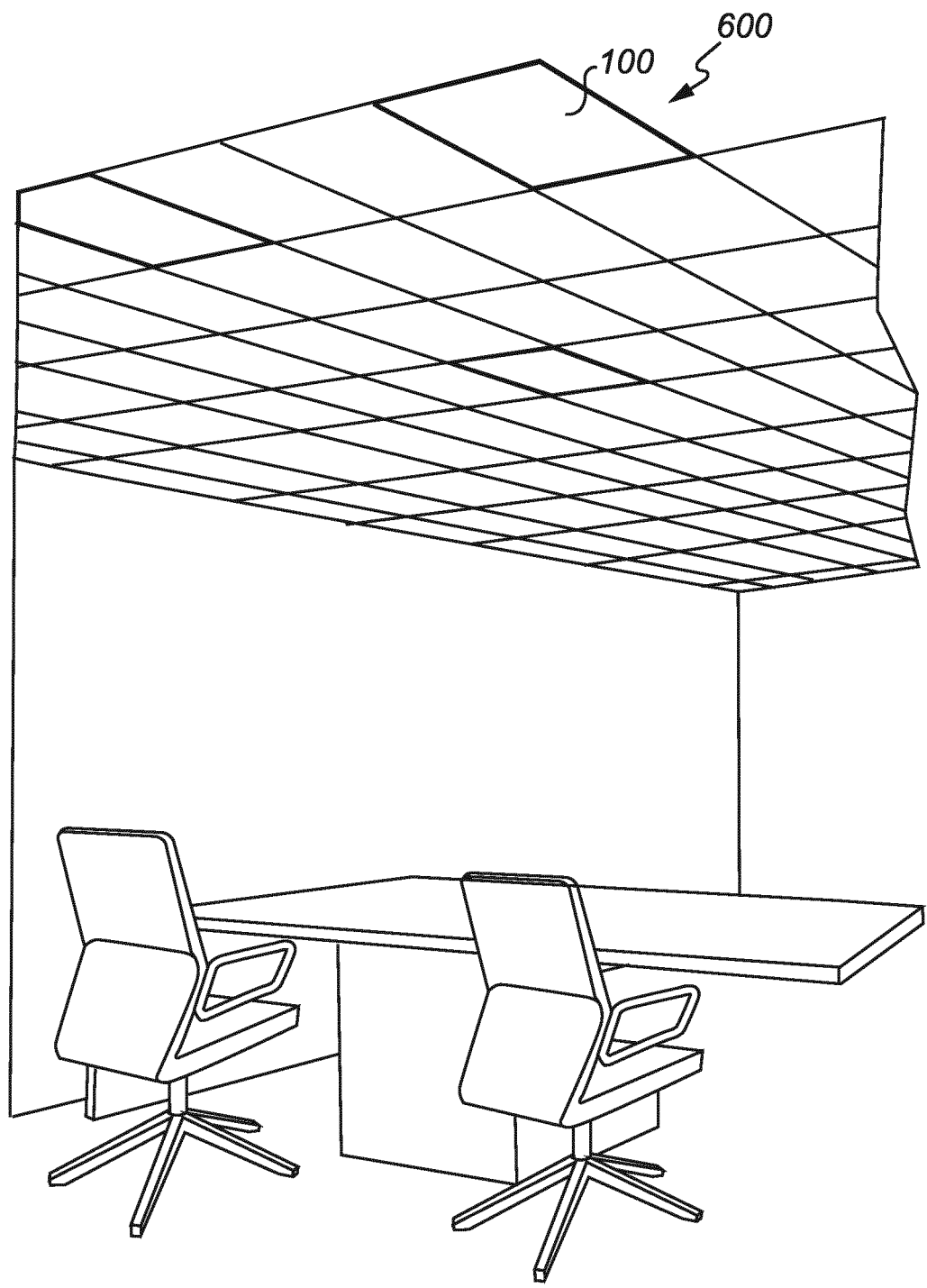

FIG. 5 schematically shows a view of a luminaire 600 comprising a lighting arrangement 100 according to an exemplifying embodiment of the present invention. According to the example of FIG. 5, the luminaire 600 is arranged in a ceiling in an office environment. Here, the luminaire 600 is arranged so that it is flush with the ceiling. The luminaire 600 may have a relatively small height, e.g. less than 20 mm, such that it may be particularly suitable for a recessed arrangement in a ceiling.

The person skilled in the art realizes that the present invention by no means is limited to the preferred embodiments described above. On the contrary, many modifications and variations are possible within the scope of the appended claims. For example, one or more of the components of the lighting arrangement 100, such as the PCB 120, the light guide element 130, the support structure 150, etc., may have different shapes, dimensions and/or sizes than those depicted/described.

The invention claimed is:

1. A lighting arrangement, comprising:
   at least one light emitting diode, LED, arranged to emit light,
   a printed circuit board, PCB, arranged to support the at least one LED,
   a light guide element configured to guide light emitted from the at least one LED, wherein the light guide element is plate-shaped and arranged in a plane, P, and wherein the at least one LED is arranged at an edge of the light guide element,
   a support structure fastened to the PCB and arranged at at least a first edge portion of the light guide element, wherein the support structure comprises:
     a first portion and a second portion arranged to extend along a first side and a second side of the light guide element, respectively, and along a portion of the light guide element in the plane, P, wherein the first portion and the second portion abut the first side and the second side of the light guide element, respectively, and
     a groove having opening and an inner wall,
   and
   a cover plate arranged in parallel to the plane, P, and arranged to cover the first side of the light guide element, wherein the cover plate comprises at least one flange connected to the cover plate by a first end,
   wherein the at least one flange is matingly and biasedly arranged in the groove of the support structure in that the flange contacts the inner wall of the groove at a contact location C, wherein the inner wall of the groove extends at a groove angle π from the opening to the contact location C, and the flange extends at a flange angle σ from its first end to the contact location C, wherein said groove angle π is 1.5° to 20° larger than the flange angle σ for biasing the first portion of the support structure towards the light guide element, whereby the first portion and the second portion clamp the at least a first edge portion of the light guide element for positioning of the at least one LED at the edge of the light guide element.

2. The lighting arrangement according to claim 1, wherein at least a portion of the groove is inclined with respect to a normal, $N_1$, to the plane, P, and inclined in an opposite direction of a normal, $N_2$, to the edge of the light guide element, whereby the at least a portion of the groove forms a V-shaped profile.

3. The lighting arrangement according to claim 2, wherein the at least a portion the groove is inclined with respect to the normal, $N_1$, to the plane, P, and inclined in an opposite direction of the normal, $N_2$, to the edge of the light guide element, by a first angle, α, wherein the first angle, α, is in the range $1.5°≤α≤20°$.

4. The lighting arrangement according to claim 1, wherein the at least one flange is arranged at a peripheral portion of the cover plate.

5. The lighting arrangement according to claim 4, wherein the lighting arrangement comprises a plurality of flanges spaced apart by respective peripheral regions of the cover plate, wherein the plurality of fastening elements is arranged in the peripheral regions.

6. The lighting arrangement according to claim 1, wherein the groove angle π and/or the flange angle σ are smaller by at least 3° than 90°.

7. The lighting arrangement according to claim 6, wherein the lighting arrangement is free from fastening elements.

8. The lighting arrangement according to claim 1, further comprising at least one spacer element arranged between the PCB and the light guide element for defining a minimum distance therebetween.

9. The lighting arrangement according to claim 1, wherein the light guide element comprises a light guide and a reflector, wherein the light guide and the reflector are superimposed.

10. The lighting arrangement according to claim 1, wherein the groove is inclined with respect to a normal, $N_1$, to the plane, P, and inclined in a direction of a normal, $N_2$, to the edge of the light guide element, by a second angle, β, wherein the second angle, β, is in the range $1.5°≤β≤20°$.

11. The lighting arrangement according to claim 1, wherein at least a portion of the at least one flange is inclined with respect to a normal, $N_1$, to the plane, P, and inclined in an opposite direction of a normal, $N_2$, to the edge of the light guide element by a third angle, γ, wherein the third angle, γ, is in the range $1.5°≤γ≤20°$.

12. The lighting arrangement according to claim 1, further comprising a plurality of fastening elements arranged to fasten the cover plate to the support structure.

13. The lighting arrangement according to claim 1, further comprising a diffuser element arranged parallel to the light guide element and configured to diffuse light emitted from the at least one LED, wherein the support structure comprises a third portion arranged to hold the diffuser element.

14. The lighting arrangement according to claim 1, further comprising an optical element arranged at at least a second edge portion of the light guide element.

15. A luminaire for arrangement in a ceiling, comprising:
a lighting arrangement according to any one of the preceding claims,
an electrical connection connected to the at least one LED for a supply of power to the at least one LED.

* * * * *